US010825105B2

(12) United States Patent
Bigwood et al.

(10) Patent No.: US 10,825,105 B2
(45) Date of Patent: Nov. 3, 2020

(54) DATA OBJECT MATCHING BASED ON HIERARCHIES FOR SOFTWARE APPLICATIONS

(71) Applicant: SAP SE, Walldorf (DE)

(72) Inventors: Jeffrey Bigwood, Golden Valley, MN (US); Ronald Van Der Linden, Eden Prairie, MN (US); Anuradha Venkataraman, Plymouth, MN (US); David Shiell, St. Louis Park, MN (US)

(73) Assignee: SAP SE, Walldorf (DE)

( * ) Notice: Subject to any disclaimer, the term of this patent is extended or adjusted under 35 U.S.C. 154(b) by 338 days.

(21) Appl. No.: 15/790,709

(22) Filed: Oct. 23, 2017

(65) Prior Publication Data

US 2019/0122306 A1     Apr. 25, 2019

(51) Int. Cl.
| | |
|---|---|
| *G06Q 30/00* | (2012.01) |
| *G06Q 40/00* | (2012.01) |
| *G06F 16/93* | (2019.01) |
| *G06F 16/248* | (2019.01) |
| *G06F 16/25* | (2019.01) |
| *H04L 29/08* | (2006.01) |

(52) U.S. Cl.
CPC ........... *G06Q 40/12* (2013.12); *G06F 16/248* (2019.01); *G06F 16/252* (2019.01); *G06F 16/93* (2019.01); *H04L 67/10* (2013.01)

(58) Field of Classification Search
CPC ....... G06Q 40/12; G06F 16/93; G06F 16/248; G06F 16/252
See application file for complete search history.

(56) References Cited

U.S. PATENT DOCUMENTS

| | | | | |
|---|---|---|---|---|
| 8,301,554 | B2* | 10/2012 | Simpson | G06Q 30/0601 705/38 |
| 10,127,558 | B2* | 11/2018 | Bulman | G06Q 30/00 |
| 2002/0097277 | A1* | 7/2002 | Pitroda | G06F 16/748 715/854 |
| 2003/0088536 | A1* | 5/2003 | Behnia | G06Q 40/02 |
| 2006/0143220 | A1* | 6/2006 | Spencer, Jr. | G06F 8/20 |
| 2007/0192199 | A1* | 8/2007 | Simpson | G06Q 30/08 705/26.1 |
| 2008/0147821 | A1* | 6/2008 | Dietrich | G06F 16/1834 709/216 |
| 2009/0281865 | A1* | 11/2009 | Stoitsev | G06Q 10/06312 705/7.22 |
| 2011/0010278 | A1* | 1/2011 | Bulman | G06Q 40/12 705/30 |

(Continued)

*Primary Examiner* — Talia F Crawley
(74) *Attorney, Agent, or Firm* — Fountainhead Law Group P.C.

(57) ABSTRACT

Some embodiments provide a non-transitory machine-readable medium that stores a program. The program generates a set of documents. The program further loads data associated with each data object in a set of data objects in a document in the set of documents. The program also receives a record from a first user. The record includes a set of items. For each item in the set of items, the program further determines one or more data objects in the set of data objects based on a hierarchy of users by performing a search on the set of documents and associating the item with the one or more data objects in the set of data objects. The program also provides to a second user information for a subset of the set of data objects associated with the second user.

20 Claims, 10 Drawing Sheets

(56) References Cited

U.S. PATENT DOCUMENTS

| | | | |
|---|---|---|---|
| 2012/0063594 A1* | 3/2012 | Spalka | H04L 9/0836 380/44 |
| 2014/0280363 A1* | 9/2014 | Heng | G06F 1616/2246 707/802 |
| 2018/0089299 A1* | 3/2018 | Collins | G06F 16/282 |
| 2018/0150535 A1* | 5/2018 | Franz | G06F 16/24578 |

* cited by examiner

| 205 | Budget 1 |
|---|---|
| Name: | Company Travel |
| Start Date: | 1/1/2017 |
| End Date: | 12/31/2017 |
| Expense Types: | Airfare, Car Rental, Hotel |
| Approvers: | President, Vice President 1, Vice President 2 |
| Total Amount: | $100,000.00 |

| 210 | Budget 2 |
|---|---|
| Name: | Sales Travel |
| Start Date: | 1/1/2017 |
| End Date: | 12/31/2017 |
| Expense Types: | Airfare, Car Rental, Hotel |
| Approvers: | Vice President 1, Director 2, Manager 2 |
| Total Amount: | $50,000.00 |

| 215 | Budget 3 |
|---|---|
| Name: | Meals and Entertainment |
| Start Date: | 1/1/2017 |
| End Date: | 12/31/2017 |
| Expense Types: | Breakfast, Lunch, Dinner, Business Meal, Entertainment |
| Approvers: | President, Vice President 1, Vice President 2 |
| Total Amount: | $15,000.00 |

| 220 | Budget 4 |
|---|---|
| Name: | Office |
| Start Date: | 1/1/2017 |
| End Date: | 12/31/2017 |
| Expense Types: | Office Supplies, Software, Computers, Office Furniture |
| Approvers: | President, Vice President 1, Vice President 2 |
| Total Amount: | $10,000.00 |

FIG. 2

Expense Report

Expenses

| Item | Date | Expense Type | Amount |
|---|---|---|---|
| 1 | 7/1/2017 | Airfare | $2,500.00 |
| 2 | 7/1/2017 | Business Meal | $1,475.00 |
| 3 | 7/13/2017 | Software | $250.00 |

Total Amount: $4,225.00

305 — 310 — 315

300

FIG. 3

DATA OBJECT MATCHING BASED ON HIERARCHIES FOR SOFTWARE APPLICATIONS

BACKGROUND

Today, software applications may be distributed in a number of different ways. For instance, a software application can be installed on a computing device and executed by the computing device. Such a software application may be referred to as standalone software applications. In some instances, a software application may be hosted on one or more computing devices (e.g., a cloud computing system) and accessed by client devices via networks (e.g., the Internet). Such a software application may be referred to as on-demand software. The method of distributing such a software application may be referred to as software as a service (SaaS). Many types of software applications are distributed using SaaS, such as messaging software, payroll processing software, database management system (DBMS) software, management software, computer-aided design (CAD) software, development software, accounting software, travel and expense management software, collaboration software, customer relationship management (CRM) software, enterprise resource planning (ERP) software, human resource management (HRM) software, content management (CM) software, etc.

SUMMARY

In some embodiments, a non-transitory machine-readable medium stores a program. The program generates a set of documents. The program further loads data associated with each data object in a set of data objects in a document in the set of documents. The program also receives a record from a first user. The record includes a set of items. For each item in the set of items, the program further determines one or more data objects in the set of data objects based on a hierarchy of users by performing a search on the set of documents and associating the item with the one or more data objects in the set of data objects. The program also provides to a second user information for a subset of the set of data objects associated with the second user.

In some embodiments, each data object in the set of data object may specify one or more users in the hierarchy of users. Determining the one or more data objects in the set of data objects for each item may include identifying the first user in the hierarchy of users, traversing the hierarchy of users to identify a set of users that are ancestors of the first user, identifying data objects in the set of data objects that specify at least one user in the set of users or the first user, and including the identified data objects in the one or more data objects. Each data object in the set of data objects may specify a date range. Each item in the set of items may include a transaction date associated with the item. Determining the one or more data objects in the set of data objects for each item may include identifying data objects in the set of data objects having a date range within which the transaction date of the item falls and including the identified data objects in the one or more data objects.

In some embodiments, each data object in the set of data objects may specify a set of item types. Each item in the set of items may include an item type associated with the item. Determining the one or more data objects in the set of data objects for each item may include identifying data objects in the set of data objects having an item type in the set of item types that matches the item type associated with the item and including the identified data objects in the one or more data objects. The information for each data object in the subset of the set of data objects may include a total amount, a first amount of the total amount that is spent, a second amount of the total amount that is available for spending, and an amount of the second amount that is pending approval. The record that includes the set of items may be a first record that includes a first set of items. The subset of the set of data objects may be a first subset of the set of data objects. The program may further receiving a second record from a third user. The second record may include a second set of items. For each item in the second set of items, the program may also determine one or more data objects in the set of data objects based on the hierarchy of users by performing a search on the set of documents and associate the item with the one or more data objects in the set of data objects. The program may further provide to a fourth user information for a second subset of the set of data objects associated with the fourth user.

In some embodiments, a method generates a set of documents. The method further loads data associated with each data object in a set of data objects in a document in the set of documents. The method also receives a record from a first user. The record includes a set of items. For each item in the set of items, the method further determines one or more data objects in the set of data objects based on a hierarchy of users by performing a search on the set of documents and associates the item with the one or more data objects in the set of data objects. The method also provides to a second user information for a subset of the set of data objects associated with the second user.

In some embodiments, each data object in the set of data object may specify one or more users in the hierarchy of users. Determining the one or more data objects in the set of data objects for each item may include identifying the first user in the hierarchy of users, traversing the hierarchy of users to identify a set of users that are ancestors of the first user, identifying data objects in the set of data objects that specify at least one user in the set of users or the first user, and including the identified data objects in the one or more data objects. Each data object in the set of data objects may specify a date range. Each item in the set of items may include a transaction date associated with the item. Determining the one or more data objects in the set of data objects for each item may include identifying data objects in the set of data objects having a date range within which the transaction date of the item falls and including the identified data objects in the one or more data objects.

In some embodiments, each data object in the set of data objects may specify a set of item types. Each item in the set of items may include an item type associated with the item. Determining the one or more data objects in the set of data objects for each item may include identifying data objects in the set of data objects having an item type in the set of item types that matches the item type associated with the item and including the identified data objects in the one or more data objects. The information for each data object in the subset of the set of data objects may include a total amount, a first amount of the total amount that is spent, a second amount of the total amount that is available for spending, and an amount of the second amount that is pending approval. The record that includes the set of items may be a first record that includes a first set of items. The subset of the set of data objects may be a first subset of the set of data objects. The method may further receive a second record from a third user. The second record may include a second set of items. For each item in the second set of items, the method may also determine one or more data objects in the set of data objects based on the hierarchy of users by performing a search on the set of documents and associate the item with the one or more data objects in the set of data objects. The method may further provide to a fourth user information for a second subset of the set of data objects associated with the fourth user.

In some embodiments, a system includes a set of processing units and a non-transitory machine-readable medium that stores instructions. The instructions cause at least one processing unit to generate a set of documents. The instructions further cause the at least one processing unit to load data associated with each data object in a set of data objects in a document in the set of documents. The instructions also cause the at least one processing unit to receive a record from a first user. The record includes a set of items. For each item in the set of items, the instructions further cause the at least one processing unit to determine one or more data objects in the set of data objects based on a hierarchy of users by performing a search on the set of documents and associate the item with the one or more data objects in the set of data objects. The instructions also cause the at least one processing unit to provide to a second user information for a subset of the set of data objects associated with the second user.

In some embodiments, each data object in the set of data object may specify one or more users in the hierarchy of users. Determining the one or more data objects in the set of data objects for each item may include identifying the first user in the hierarchy of users, traversing the hierarchy of users to identify a set of users that are ancestors of the first user, identifying data objects in the set of data objects that specify at least one user in the set of users or the first user, and including the identified data objects in the one or more data objects. Each data object in the set of data objects may specify a date range. Each item in the set of items may include a transaction date associated with the item. Determining the one or more data objects in the set of data objects for each item may include identifying data objects in the set of data objects having a date range within which the transaction date of the item falls and including the identified data objects in the one or more data objects.

In some embodiments, each data object in the set of data objects may specify a set of item types. Each item in the set of items may include an item type associated with the item. Determining the one or more data objects in the set of data objects for each item may include identifying data objects in the set of data objects having an item type in the set of item types that matches the item type associated with the item and including the identified data objects in the one or more data objects. The information for each data object in the subset of the set of data objects may include a total amount, a first amount of the total amount that is spent, a second amount of the total amount that is available for spending, and an amount of the second amount that is pending approval. The record that includes the set of items may be a first record that includes a first set of items. The subset of the set of data objects may be a first subset of the set of data objects. The instructions may further cause the at least one processing unit to receive a second record from a third user. The second record may include a second set of items. For each item in the second set of items, the instructions may also cause the at least one processing unit to determine one or more data objects in the set of data objects based on the hierarchy of users by performing a search on the set of documents and associate the item with the one or more data objects in the set of data objects. The instructions may further cause the at least one processing unit to provide to a fourth user information for a second subset of the set of data objects associated with the fourth user.

The following detailed description and accompanying drawings provide a better understanding of the nature and advantages of the present invention.

BRIEF DESCRIPTION OF THE DRAWINGS

FIG. 2 illustrates example budgets according to some embodiments.

FIG. 3 illustrates an example expense report according to some embodiments.

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for managing budgets in an expense management application. In some embodiments, the expense management application operates on a computing system that is accessible by client devices. If the computing system receives an expense record (e.g., an expense report, an invoice, a purchase request, an expense pre-authorization request, etc.) that includes one or more expense items, the computing system searches through budgets stored in the computing system and determines budgets that are associated with the expense items in the expense record. In some embodiments, the budgets stored in the computing system are implemented as data objects. The computing system may determine budgets associated with a particular expense item in the expense record based on any number of different criteria. Examples of such criteria include the transaction date of the expense item, the expense type of the expense item, the user that submitted the expense item, etc.

Figure 1:
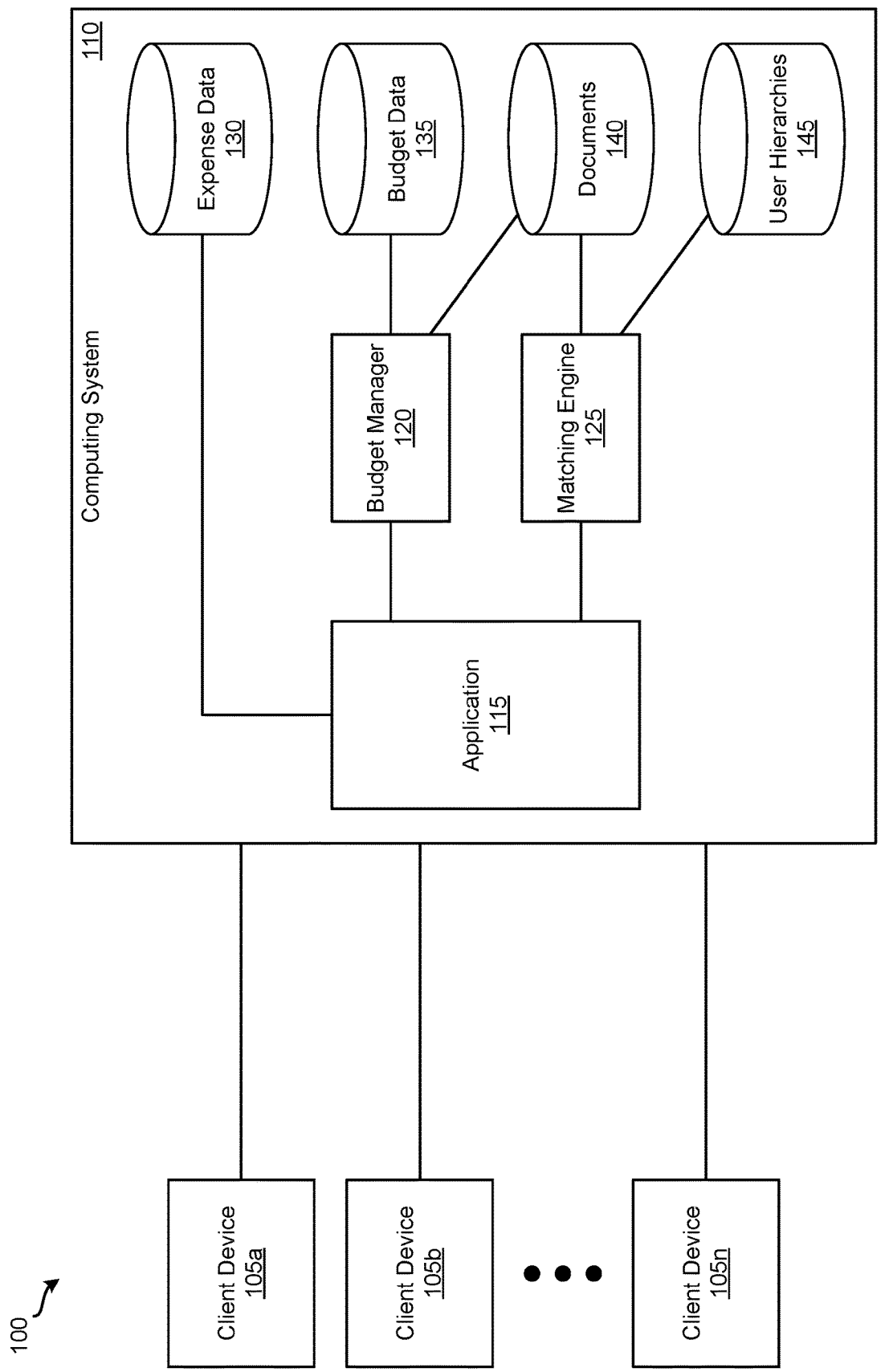
FIG. 1 illustrates a system for managing budgets according to some embodiments.

FIG. 1 illustrates system 100 for managing budgets according to some embodiments. As shown, system 100 includes client devices 105a-n and computing system 110. Client devices 105a-n are each configured to communicate and interact with computing system 110. For example, a user of a client device 105 may access a budget tool provided (e.g., through a graphical user interface (GUI) by application 115 that allows the user to define budgets. As another example, a user of a client device 105 may access application 115 and send requests (e.g., through a GUI provide by application 115) that includes one or more expense items to application 115 for processing. As yet another example, a user of a client device 105 may send application 115 requests to view budgets associated with the user and requests to approve expense items associated with the budgets.

As illustrated in FIG. 1, computing system 110 includes application 115, budget manager 120, matching engine 125, and storages 130-145. Expense data storage 130 is configured to store data associated with expense records. Examples of expense records may include expense reports, invoices, purchase requests, expense pre-authorization requests, etc.). In some embodiments, an expense record may include one or more expense items. An expense item, in some such embodiments, may specify a transaction date, an expense type, an amount, a user associated with the expense item (e.g., a user that submitted the expense item). Budget data storage 135 is configured to store budgets. In some embodiments, a budget may specify a name for the budget, a total amount for the budget, a date range (e.g., a start date and an end date) of the budget, a set of expense types allowed for the budget, and a set of approvers that may approve expense items for the budget. A budget stored in budget data storage 135 can be implemented as a data object. As such, in some such embodiments, a data object that represents a budget may include attributes for a name for the budget, a total amount for the budget, a date range (e.g., a start date and an end date) of the budget, a set of expense types allowed for the budget, and a set of approvers that may approve expense items for the budget. Documents storage 140 may store documents that include budget data from budget data storage 135. User hierarchies storage 145 can store hierarchies of user (e.g., a hierarchy of employees in a company). In some embodiments, storages 130-145 are implemented in a single physical storage while, in other embodiments, storages 130-145 may be implemented across several physical storages. While FIG. 1 shows storages 130-145 as part of computing system 110, one of ordinary skill in the art will appreciate that storages 130, 135, 140 and/or 145 may be external to in computing system 110 in some embodiments.

Application 115 may be a software application operating on (e.g., hosted on) computing system 110 that may be accessed by client devices 105a-n. Application 115 may be any number of different types of applications. For instance, application 115 may be an analytics application, a data management application, a human capital management application, an enterprise management application, a customer relationship management application, a travel and expense management application, a financial management application, etc.

Application 115 is configured to handle expense records received from client devices 105a-n. For instance, application 115 can receive from a client device 105 an expense record that includes one or more expense items. In some embodiments, application 115 provides a tool (e.g., via a GUI) for users of client devices 105a-n to use to create and send expense records to application 115. Once application 115 receives the expense record, application 115 stores the expense record in expense data storage 130. In addition, application 115 sends matching engine 125 the expense record along with a request to determine budgets associated with each expense item in the expense record. When application 115 receives a set of budgets for each expense item in the expense record, application 115 sends budget manager 120 the sets of budgets and the expense record for processing.

In some embodiments, application 115 provides client devices 105a-n a tool for creating budgets. As mentioned above, in some embodiments, a budget may specify a name for the budget, a total amount for spending, a date range of the budget, a set of expense types allowed for the budget, and a set of approvers that may approve expense items for the budget. When application 115 receives from a client device 105 a budget created with the tool, application 115 sends the budget to budget manager 120 for processing.

Application 115 may process requests to view budgets from a user of a client device 105. In response to such a request, application 115 sends budget manager 120 a unique identifier (ID) associated with the user (e.g., a user ID) and a request for budgets associated with the user. Once budget manager 120 identifies budgets associated with the user, application 115 receives a set of budgets from budget manager 120. Then, application 115 provides data associated with the set of budgets (e.g., via a GUI) to the client device 105 for presentation to the user. In some embodiments, the data associated with a budget that is provided to the client device 105 includes an amount of the total budget that is spent, an amount of the total budget that is available, and an amount of the available budget that is pending approval. In some instances, a budget may have one or more expense items pending for approval. A user specified as an approver for the budget may approve the expense items via the GUI through which budgets are presented to the user. When application 115 receives an approval for a pending expense item, application 115 sends budget manager 120 a notification that the pending expense item has been approved.

Budget manager 120 is responsible for managing budgets. For instance, budget manager 120 may receive a budget from application 115 for processing. As mentioned above, a budget may specify a name for the budget, a total amount for spending, a date range of the budget, a set of expense types allowed for the budget, and a set of approvers that may approve expense items for the budget in some embodiments. Upon receiving the budget, budget manager 120 can generate an amount of total budget that is spent, an amount of the total budget that is available, and an amount of the available budget that is pending approval. Next, budget manager 120 sets the amount of the total budget that is spent to zero, the amount of the total budget that is available to the total amount for spending specified in the budget, and the amount of the available budget that is pending approval to zero. Then, budget manager 120 stores the generated amounts with the budget in budget data storage 135.

Budget manager 120 also handles request for budgets associated with a particular user. In response to such a request, budget manager 120 accesses budget data 135 and performs a search for budgets stored in budget data storage 135 in which the user is specified as an approver. Budget manager 120 returns the results of the search to application 115 along with, for each budget, the amount of total budget that is spent, the amount of the total budget that is available, and the amount of the available budget that is pending approval.

Budget manager 120 can manage the generated amounts associated with budgets. For example, when budget manager 120 receives from application 115 a set of budgets for an expense item in an expense record, budget manager 120 adds the amount of the expense item to the amount of the available budget that is pending approval for each budget in the set of budgets. As another example, when budget manager 120 receives from application 115 a notification that an expense item has been approved, budget manager 120 identifies budgets associated with expense item. Then, for each identified budget, budget manager 120 deducts the amount of the expense item from the amount of the available budget that is pending approval, deducts the amount of the expense item from the amount of the total budget that is available, and adds the amount of the expense item to the amount of total budget that is spent.

Budget manager 120 may also be responsible for maintaining budget data stored in budget data storage 135 in different formats. For instance, after budget manager 120 processes a new budget and stores the budget data in budget data storage 135, budget manager may generate a document in documents storage 140 and store the budget data associated with the new budget in the generated document. When data associated with a budget stored in budget data storage 1353 is modified, budget manager 120 updates the corresponding document in documents storage 140 with the modification.

Matching engine 125 is configured to determine budgets associated with expense items. For instance, matching engine 125 may receive from application 115 an expense record and a request to determine budgets associated with each expense item in the expense record. In some embodiments, matching engine 125 determines a set of budgets associated with an expense item based on any number of different criteria. Examples of such criteria include the transaction date of the expense item, the expense type of the expense item, the user that submitted the expense item, etc. Once matching engine 125 determines a set of budgets associated with each expense item in the expense record, matching engine 125 sends the sets of budgets to application 115.

An example operation of system 100 will now be described by reference to FIGS. 2-5. At the start of the example operation, several budgets have been created, processed, and stored in budget data storage 135 (e.g., by a user of a client device 105 using a tool provided by application 115). These budgets are illustrated by FIG. 2. Specifically, FIG. 2 illustrates example budgets 205-220 according to some embodiments. For this example, budget 205 is a budget created for travel expenses of a company, budget 210 is a budget created for travel expenses of a sales team of the company, budget 215 is a budget created for meals and entertainment expenses of the company, and budget 220 is a budget created for office expenses of the company. As shown, budget 205 has a name of Company Travel; a date range with a start date of Jan. 1, 2017 and an end date of Dec. 31, 2017; a set of expense types that include Airfare, Car Rental, and Hotel; a set of approvers that include President, Vice President 1, and Vice President 2; and a total amount of $100,000.00. Budget 210 has a name of Sales Travel; a date range with a start date of Jan. 1, 2017 and an end date of Dec. 31, 2017; a set of expense types that include Airfare, Car Rental, and Hotel; a set of approvers that include Vice President 1, Director 2, and Manager 2; and a total amount of $50,000.00. Budget 215 has a name of Meals and Entertainment; a date range with a start date of Jan. 1, 2017 and an end date of Dec. 31, 2017; a set of expense types that include Breakfast, Lunch, Dinner, Business Meals, and Entertainment; a set of approvers that include President, Vice President 1, and Vice President 2; and a total amount of $15,000.00. Lastly, budget 220 has a name of Office; a date range with a start date of Jan. 1, 2017 and an end date of Dec. 31, 2017; a set of expense types that include Office Supplies, Software, Computers, and Office Furniture; a set of approvers that include President, Vice President 1, and Vice President 2; and a total amount of $10,000.00.

As part of the processing of a created budget, budget manager 120 can generate an amount of total budget that is spent, an amount of the total budget that is available, and an amount of the available budget that is pending approval. Budget manager 120 also sets the amount of the total budget that is spent to zero, the amount of the total budget that is available to the total amount for spending specified in the budget, and the amount of the available budget that is pending approval to zero. Then, budget manager 120 stores the generated amounts with the budget in budget data storage 135. After budgets 205-220 are created, processed, and stored in budget data storage 135, budget manager 120 generates a document in documents storage 140 for each of the budgets 205-220 and stores the budget data associated with each budget in a generated document.

The example operation starts by a first user of a first client device 105 (e.g., a user of client device 105*b*) creating an expense record (e.g., via a tool provided through a GUI by application 115) and sending it to application 115. FIG. 3 illustrates an example expense report 300 according to some embodiments that will be used in this example. As shown, expense report 300 includes expense items 305-315. Expense item 305 specifies a transaction date of Jul. 1, 2017, an expense type of Airfare, and an amount of $2,500.00. Expense item 310 specifies a transaction date of Jul. 1, 2017, an expense type of Business Meal, and an amount of $1,475.00 Expense item 315 specifies a transaction date of Jul. 13, 2017, an expense type of Software, and an amount of $250.00.

When application 115 receives expense report 300, application 115 stores the expense report in expense data storage 130. In addition, application 115 sends matching engine 125 expense report 300 along with a request to determine budgets associated with each expense item in expense report 300. Once matching engine 125 receives the request and expense report 300 from application 115, matching engine 125 determines a set of budgets associated with each expense item in expense report 300. As described above, matching engine 125 may determine a set of budgets associated with an expense item based on any number of different criteria. In this example, matching engine 125 determines a set of budgets associated with an expense item in expense report 300 based on the transaction date of the expense item, the expense type of the expense item, and the user that submitted the expense item. For this example, the user that submitted the expense items in expense report 300 is an employee in a company and the user hierarchies storage 145 includes a hierarchy of employees that includes the user.

Figure 4:
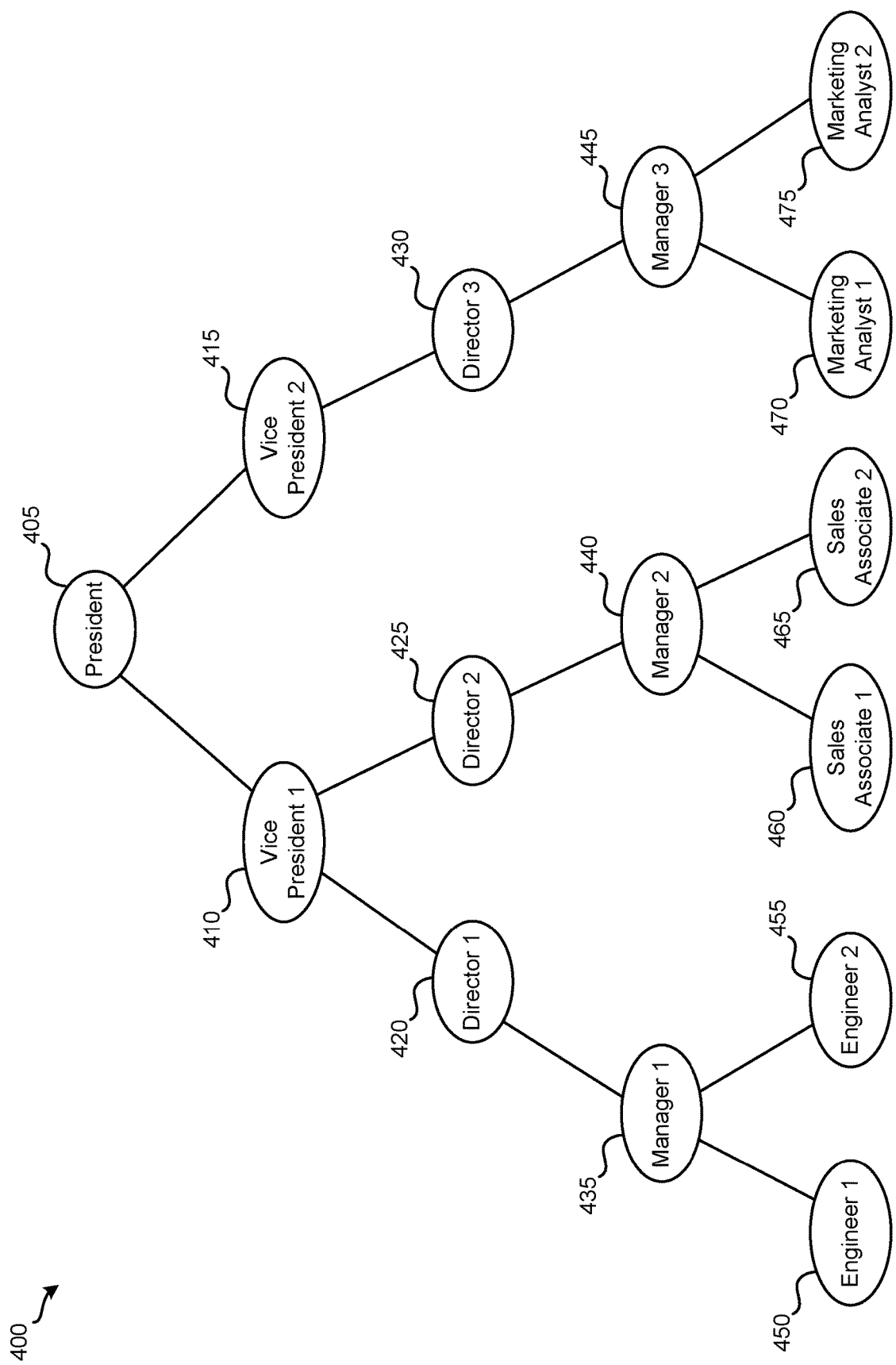
FIG. 4 illustrates an example hierarchy of employees according to some embodiments.

FIG. 4 illustrates an example hierarchy of employees 400 according to some embodiments that will be used in this example. As shown, hierarchy of employees 400 includes nodes 405-475, which represent employees of a company. Node 405 represents the President of the company. Nodes 410 and 415 are children nodes of node 405 and represent the Vice President 1 and Vice President 2, respectively, of the company. Nodes 420 and 425 are children nodes of node 410 and represent the Director 1 and Director 2, respectively, of the company. Node 430 is a child node of node 415 and represents the Director 3 of the company. Node 435 is a child node of node 420 and represents the Manager 1 of the company. Node 440 is a child node of node 425 and represents the Manager 2 of the company. Node 445 is a child node of node 430 and represents the Manager 3 of the company. Nodes 450 and 455 are children nodes of node 435 and represent the Engineer 1 and Engineer 2, respectively, of the company. Nodes 460 and 465 are children nodes of node 440 and represent the Sales Associate 1 and Sales Associate 2, respectively, of the company. Nodes 470 and 475 are children nodes of node 445 and represent the Marketing Analyst 1 and Marketing Analyst 2, respectively, of the company.

To determine the budgets associated with the expense items in expense report 300 in this example, matching engine 125 first retrieves hierarchy of employees 400 from user hierarchies storage 145 and identifies the node that represents the user that submitted the expense items in expense report 300 in hierarchy of employees 400. In this example, the user that submitted the expense items in expense report 300 is Sales Associate 2 so matching engine 125 identifies node 465. Next, matching engine 125 traverses hierarchy of employees 400 to identify ancestor nodes of node 465. For this example, matching engine 125 identifies nodes 440, 425, 410, and 405 as the ancestor nodes of node 465. Then, matching engine 125 performs a search on the documents stored in documents storage 140 to identify documents that specifies a date range within which the transaction date (i.e., Jul. 1, 2017) of expense item 305 falls, an expense type that matches the expense type of expense item (i.e., Airfare), and an approver that matches an employee represented by an ancestor node of node 465 or node 465 itself. In this example, the search performed by matching engine 125 identified budgets 205 and 210 as the budgets associated with item 305. Matching engine 125 performs similar searches for expense items 310 and 315. As such, for this example, matching engine 125 identified budget 215 as the budget associated with item 310 identified budget 220 as the budget associated with item 315. Matching engine 125 then sends these three sets of budgets for expense items 305-315 to application 115.

When application 115 receives the sets of budgets associated with expense items 305-315, application 115 sends the sets of budgets and expense items 305-315 to budget manager 120 for further processing. Budget manager 120 processes expense item 305 by adding the amount of the expense item (i.e., $2,500.00) to the amount of the available budget that is pending approval for budgets 205 and 210 stored in budget data storage 135 and setting the status of expense item 305 as pending. Next, budget manager 120 processes expense item 310 by adding the amount of the expense item (i.e., $1,475.00) to the amount of the available budget that is pending approval for budget 215 stored in budget data storage 135 and setting the status of expense item 310 as pending. Budget manager 120 then processes expense item 315 by adding the amount of the expense item (i.e., $250.00) to the amount of the available budget that is pending approval for budget 220 stored in budget data storage 135 and setting the status of expense item 315 as pending.

Next, a second user of a second client device 105 (e.g., a user of client device 105*n*) sends application 115 a request to view budgets for a budget period of the year 2017. In this example, application 115 allows the second user to view budgets in which the second user is specified as an approver. The second user requesting to view budgets for this example is Vice President 1 of the company. In response to the request, application 115 sends budget manager 120 a unique ID associated with the second user (e.g., the title Vice President 1) and a request for budgets associated with the second user. When budget manager 120 receives the request, budget manager 120 accesses budget data 135 and performs a search for budgets stored in budget data storage 135 in which the second user is specified as an approver. Since budgets 205-220 specify Vice President 1 as an approver, budget manager 120 returns budgets 205-220 to application 115 along with, for each of the budgets 205-220, the amount of total budget that is spent, the amount of the total budget that is available, and the amount of the available budget that is pending approval. Application 115 then provides data associated with budgets 205-220 to the second client device 105 of the second user.

Figure 5A:
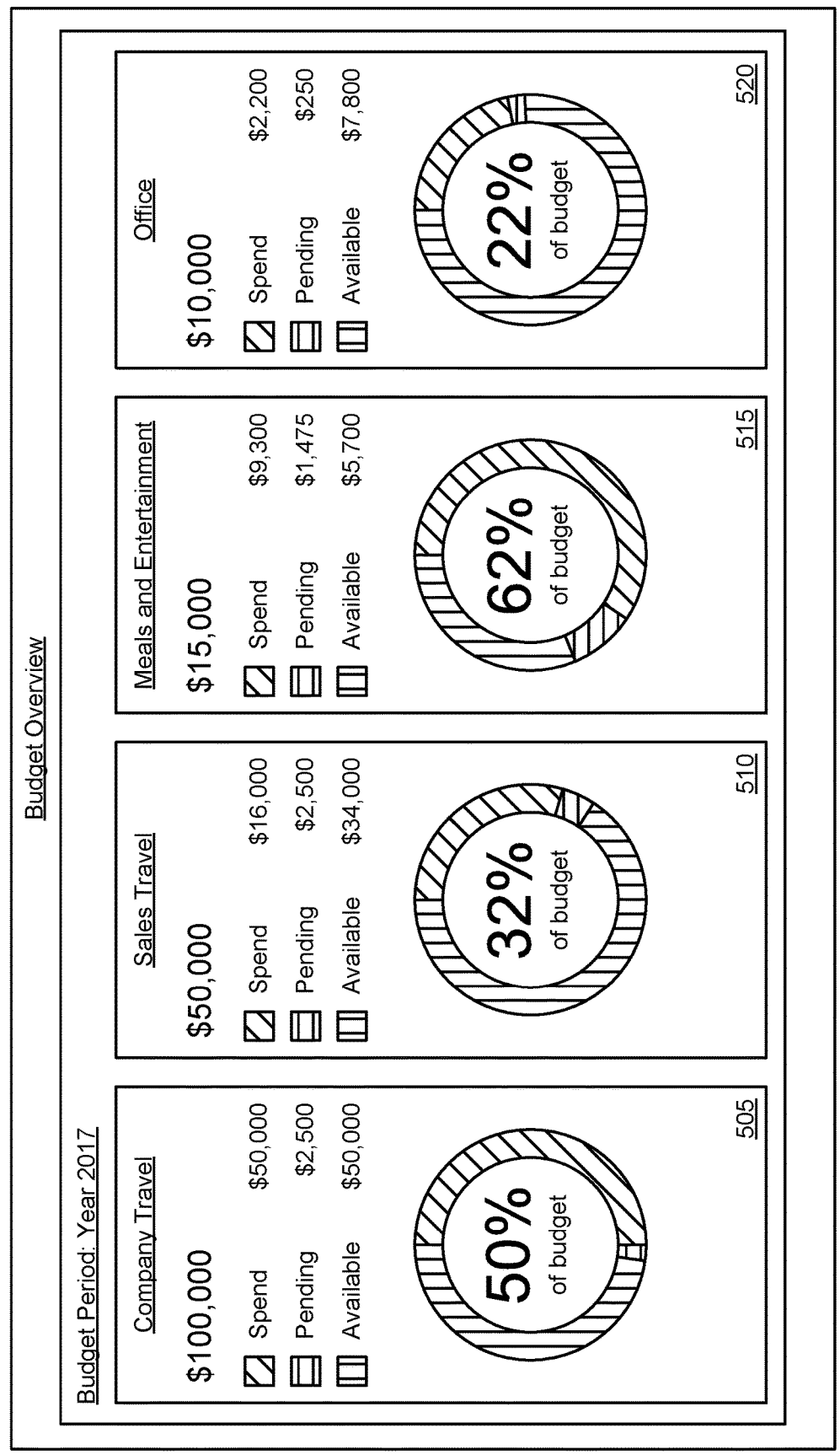
FIGS. 5A and 5B illustrate an example graphical user interface for presenting budgets according to some embodiments.
Figure 5B:
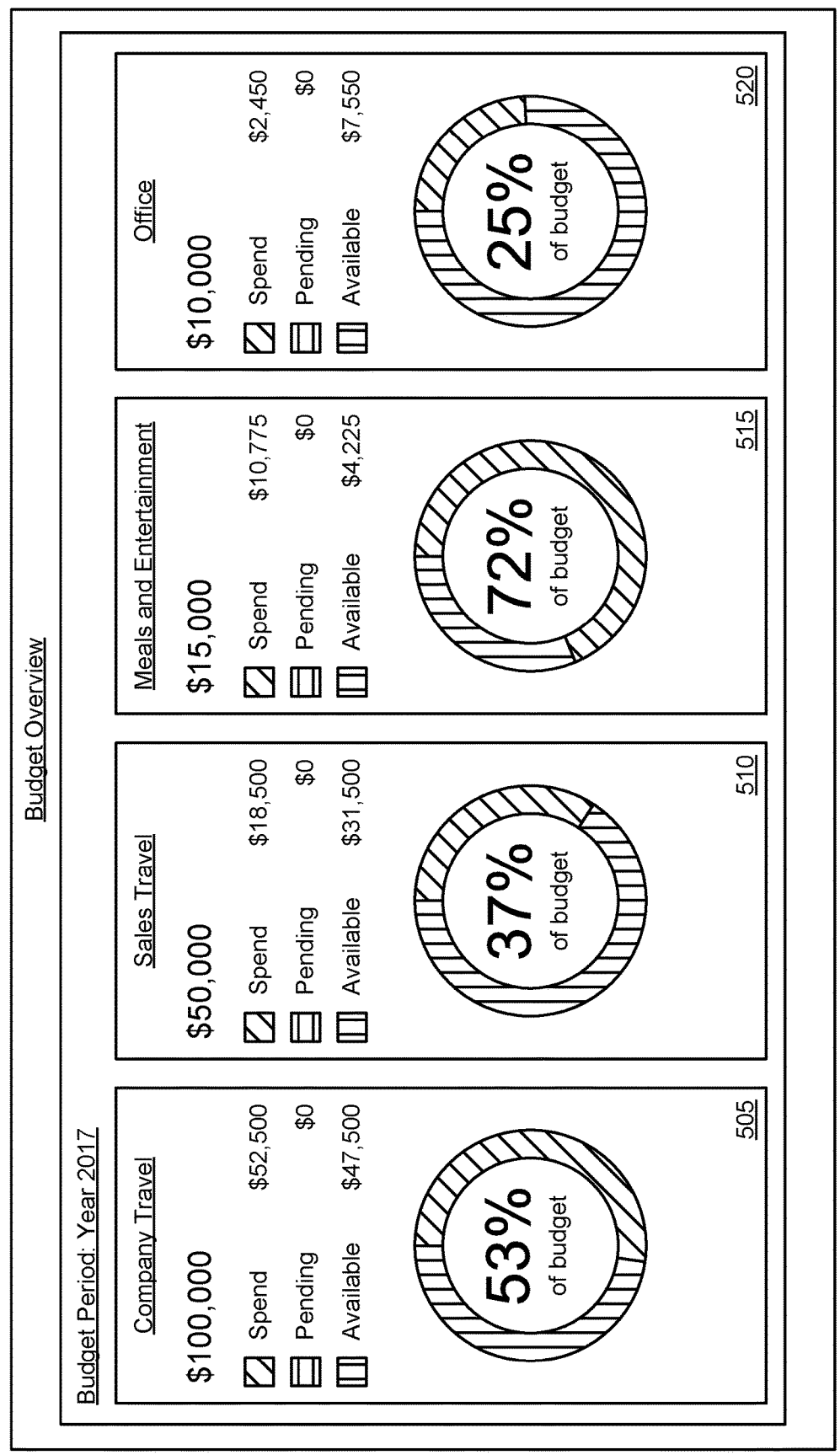

FIGS. 5A and 5B illustrate an example GUI 500 for presenting budgets according to some embodiments. Specifically, GUI 500 in FIG. 5A is presented to the second user (i.e., Vice President 1) in response to the request described above. As shown, GUI 500 is presenting budgets for a budget period of the year 2017. The budgets for this period include budgets 205-220, which are graphically illustrated by visualizations 505-520, respectively. Each of the visualizations 505-520 includes the total amount of the corresponding budget, the amount of total budget that is spent, the amount of the total budget that is available, and the amount of the available budget that is pending approval. In addition, each of the visualizations 505-520 includes a donut chart indicating the relative portion of the amount of total budget that is spent, the relative portion of the amount of the total budget that is available, and the relative amount of the available budget that is pending approval. The middle of each donut chart also includes a percentage of the amount of total budget that is spent.

After application 115 presents the second user with a view of budgets associated with the second user, the second user of the second client device 105 sends application 115 approval for pending expense items 305-315 via a page of the GUI through which the budgets were presented to the second user. When application 115 receives approval for pending expense items 305-315, application 115 sends budget manager 120 a request to approve pending expense item 305-315. Upon receiving the request, budget manager 120 identifies budgets associated with expense item 305. Then, for each identified budget, budget manager 120 deducts the amount of expense item 305 (i.e., $2,500) from the amount of the available budget that is pending approval, deducts the amount of expense item 305 from the amount of the total budget that is available, and adds the amount of expense item 305 to the amount of total budget that is spent. Next, budget manager 120 sets the status of expense item 305 as approved. Then, budget manager 120 identifies budgets associated with expense item 310. For each identified budget, budget manager 120 then deducts the amount of expense item 310 (i.e., $1,475) from the amount of the available budget that is pending approval, deducts the amount of expense item 310 from the amount of the total budget that is available, and adds the amount of expense item 310 to the amount of total budget that is spent. Next, budget manager 120 sets the status of expense item 310 as approved. Finally, budget manager 120 identifies budgets associated with expense item 315. Then, for each identified budget, budget manager 120 deducts the amount of expense item 315 from the amount of the available budget that is pending approval, deducts the amount of expense item 315 from the amount of the total budget that is available, and adds the amount of expense item 315 to the amount of total budget that is spent. Next, budget manager 120 sets the status of expense item 315 as approved.

After approving expense items 305-315, the second user of the second client device 105 sends application 115 a second request to view budgets for a budget period of the year 2017 again. In response to the request, application 115 sends budget manager 120 the unique ID associated with the second user (e.g., the title Vice President 1) and a request for budgets associated with the second user. When budget manager 120 receives the request, budget manager 120 accesses budget data 135 and performs a search for budgets stored in budget data storage 135 in which the second user is specified as an approver. Because budgets 205-220 specify Vice President 1 as an approver, budget manager 120 returns budgets 205-220 to application 115 along with, for each of the budgets 205-220, the amount of total budget that is spent, the amount of the total budget that is available, and the amount of the available budget that is pending approval. Application 115 then provides data associated with budgets 205-220 to the second client device 105 of the second user.

Referring to FIG. 5B, GUI 500 in FIG. 5B is presented to the second user (i.e., Vice President 1) in response to the second request described above. As shown, GUI 500 is presenting budgets for a budget period of the year 2017. The budgets for this period include budgets 205-220, which are graphically illustrated by visualizations 505-520, respectively. Each of the visualizations 505-520 now show the amount of total budget that is spent, the amount of the total budget that is available, and the amount of the available budget that is pending approval after the second user approved expense items 305-315. In addition, the donut chart of each of the visualizations 505-520 now shows the relative portion of the amount of total budget that is spent, the relative portion of the amount of the total budget that is available, and the relative amount of the available budget that is pending approval after the second user approved expense items 305-315. Lastly, the percentage of the amount of total budget that is spent shown in the middle of each donut chart reflects the approval of expense items 305-315.

FIGS. 5A and 5B illustrate an example GUI for presenting budgets. The GUI includes a donut chart indicating the relative portion of the amount of total budget that is spent, the relative portion of the amount of the total budget that is available, and the relative amount of the available budget that is pending approval. One of ordinary skill in the art will recognize that different charts may be used to graphically present the relative portion of the amount of total budget that is spent, the relative portion of the amount of the total budget that is available, and the relative amount of the available budget that is pending approval in different embodiments. For instance, a bar chart may be used in some embodiments.

The example operation of system 100 described above illustrates budget manager 120 determining budgets associated with an expense item based on the transaction date of the expense item, the expense type of the expense item, and the user that submitted the expense item. One of ordinary skill in the art will appreciate that additional and/or different criteria may be used to determining budgets associated with an expense item. For example, budget manager 120 may determine budgets associated with an expense item based on the transaction date of the expense item and the expense type of the expense item; based on the transaction date of the expense item and the user that submitted the expense item, or based on the transaction date of the expense item in some embodiments.

In addition, the example operation described above illustrates a first user of a first client device 105 creating an expense record and a second user of a second client device 105 requesting to view budgets for a particular period of time. One of ordinary skill in the art will recognize that the first user and/or different users may use any of client devices 105a-n to create additional and/or different expense records and send them to application 115 in the same or similar manner described in the example operation. Furthermore, any number of other users may use any of client devices 105a-n to send application 115 requests to view budgets for the same particular period of time and/or different periods of time.

Figure 6:
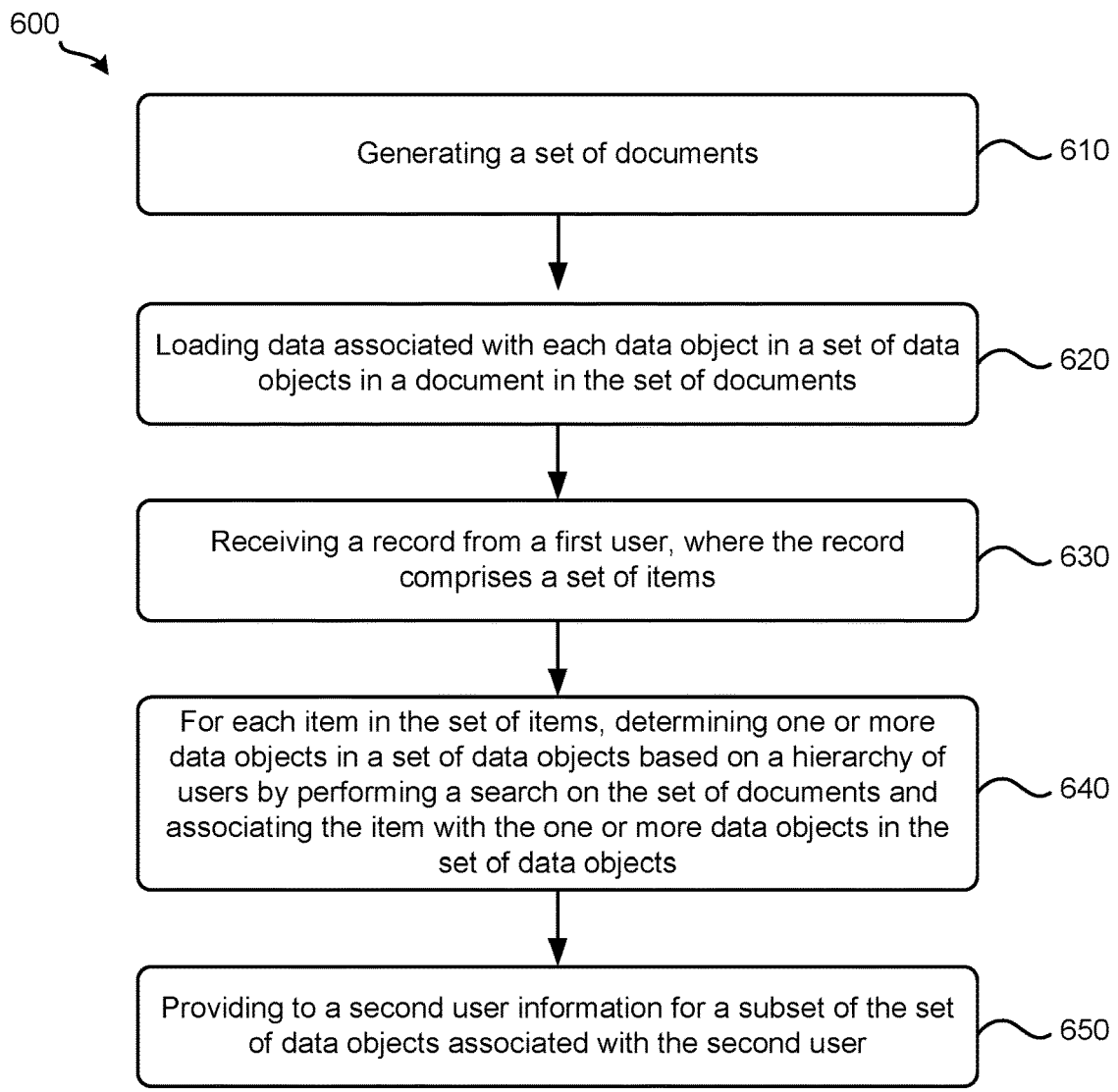
FIG. 6 illustrates a process for managing budgets according to some embodiments.

FIG. 6 illustrates a process 600 for managing budgets according to some embodiments. In some embodiments, computing system 110 performs process 600. Process 600 begins by generating, at 610, a set of documents. Referring to FIGS. 1 and 2 as an example, budget manager 120 may create budgets 205-220, process budgets 205-220, and store budgets 205-220 in budget data storage 135. Next, budget manager 120 can generate a document in documents storage 140 for each of the budgets 205-220. Next, process 600 loads, at 620, data associated with each data object in a set of data objects in a document in the set of documents. Referring to FIGS. 1 and 2 as an example, after budget manager 120 generates a document in documents storage 140 for each of the budgets 205-220, budget manager 120 stores the budget data associated with each of the budgets 205-220 in a generated document. That is, budget manager 120 stores budget data associated with budget 205 in a first document generated in documents storage 140, stores budget data associated with budget 210 in a second document generated in documents storage 140, stores budget data associated with budget 215 in a third document generated in documents storage 140, and stores budget data associated with budget 220 in a fourth document generated in documents storage 140.

Process 600 then receives, at 630, a record from a first user, where the record comprises a set of items. Referring to FIGS. 1 and 3 as an example, application 115 may receive expense report 300, which includes expense items 305-315, from a user of a client device 105. Next, for each item in the set of items, process 600 determines, at 640, one or more data objects (e.g., budgets) in a set of data objects based on a hierarchy of users by performing a search on the set of documents and associates the expense item with the one or more data objects in the set of data objects. Referring to FIGS. 1-4 as an example, once application 115 receives expense report 300, application 115 sends matching engine 125 expense report 300 and a request to determine budgets associated with each expense item in expense report 300. Matching engine 125 then determines a set of budgets associated with each expense item in expense report 300 by traversing hierarchy of employees 400 and performing a search on the documents stored in documents storage 140, as described in the example operation described above. As a result, matching engine 125 determines that budgets 205 and 210 are associated with expense item 305, budget 215 is associated with expense item 310, and budget 220 is associated with expense item 315.

Finally, process 600, provides, at 650, to a second user information for a subset of the set of data objects associated with the second user. Referring to FIGS. 1 and 5A as an example, application 115 may receive from a second user (Vice President 1 in this example) a request to view budgets for a particular budget period (the year 2017 in this example). In response to the request, application 115 sends budget manager 120 a unique ID associated with the second user and a request for budgets associated with the second user. When budget manager 120 receives the request, budget manager 120 accesses budget data 135 and performs a search for budgets stored in budget data storage 135 in which the second user is specified as an approver. Because budgets 205-220 specify Vice President 1 as an approver, budget manager 120 returns budgets 205-220 to application 115 along with, for each of the budgets 205-220, the amount of total budget that is spent, the amount of the total budget that is available, and the amount of the available budget that is pending approval. Application 115 then provides data associated with budgets 205-220, as illustrated by FIG. 5A, to the second user.

Figure 7:
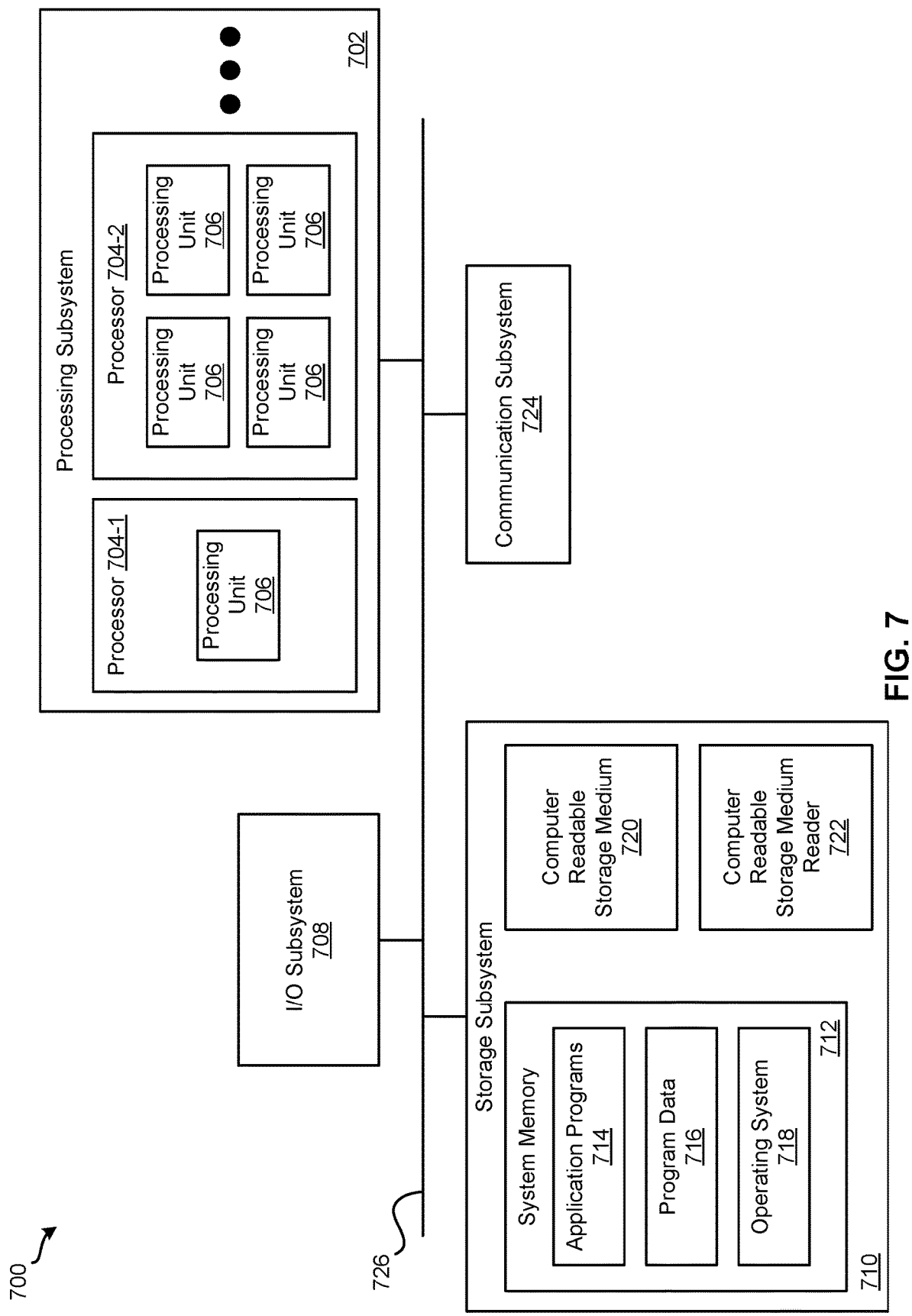
FIG. 7 illustrates an exemplary computer system, in which various embodiments may be implemented.

FIG. 7 illustrates an exemplary computer system 700 for implementing various embodiments described above. For example, computer system 700 may be used to implement systems client devices 105a-n and computing system 110. Computer system 700 may be a desktop computer, a laptop, a server computer, or any other type of computer system or combination thereof. Some or all elements of application 115, budget manager 120, matching engine 125, or combinations thereof can be included or implemented in computer system 700. In addition, computer system 700 can implement many of the operations, methods, and/or processes described above (e.g., process 600). As shown in FIG. 7, computer system 700 includes processing subsystem 702, which communicates, via bus subsystem 726, with input/output (I/O) subsystem 708, storage subsystem 710 and communication subsystem 724.

Bus subsystem 726 is configured to facilitate communication among the various components and subsystems of computer system 700. While bus subsystem 726 is illustrated in FIG. 7 as a single bus, one of ordinary skill in the art will understand that bus subsystem 726 may be implemented as multiple buses. Bus subsystem 726 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 702, which can be implemented as one or more integrated circuits (e.g., a conventional microprocessor or microcontroller), controls the operation of computer system 700. Processing subsystem 702 may include one or more processors 704. Each processor 704 may include one processing unit 706 (e.g., a single core processor such as processor 704-1) or several processing units 706 (e.g., a multicore processor such as processor 704-2). In some embodiments, processors 704 of processing subsystem 702 may be implemented as independent processors while, in other embodiments, processors 704 of processing subsystem 702 may be implemented as multiple processors integrate into a single chip or multiple chips. Still, in some embodiments, processors 704 of processing subsystem 702 may be implemented as a combination of independent processors and multiple processors integrated into a single chip or multiple chips.

In some embodiments, processing subsystem 702 can execute a variety of programs or processes in response to program code and can maintain multiple concurrently executing programs or processes. At any given time, some or all of the program code to be executed can reside in processing subsystem 702 and/or in storage subsystem 710. Through suitable programming, processing subsystem 702 can provide various functionalities, such as the functionalities described above by reference to process 600, etc.

I/O subsystem 708 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 700 to a user or another device (e.g., a printer).

As illustrated in FIG. 7, storage subsystem 710 includes system memory 712, computer-readable storage medium 720, and computer-readable storage medium reader 722. System memory 712 may be configured to store software in the form of program instructions that are loadable and executable by processing subsystem 702 as well as data generated during the execution of program instructions. In some embodiments, system memory 712 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 712 may include different types of memory, such as static random access memory (SRAM) and/or dynamic random access memory (DRAM). System memory 712 may include a basic input/output system (BIOS), in some embodiments, that is configured to store basic routines to facilitate transferring information between elements within computer system 700 (e.g., during start-up). Such a BIOS may be stored in ROM (e.g., a ROM chip), flash memory, or any other type of memory that may be configured to store the BIOS.

As shown in FIG. 7, system memory 712 includes application programs 714 (e.g., application 115, program data 716, and operating system (OS) 718. OS 718 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 720 may be a non-transitory computer-readable medium configured to store software (e.g., programs, code modules, data constructs, instructions, etc.). Many of the components (e.g., application 115, budget manager 120, and matching engine 125) and/or processes (e.g., process 600) described above may be implemented as software that when executed by a processor or processing unit (e.g., a processor or processing unit of processing subsystem 702) performs the operations of such components and/or processes. Storage subsystem 710 may also store data used for, or generated during, the execution of the software.

Storage subsystem 710 may also include computer-readable storage medium reader 722 that is configured to communicate with computer-readable storage medium 720. Together and, optionally, in combination with system memory 712, computer-readable storage medium 720 may comprehensively represent remote, local, fixed, and/or removable storage devices plus storage media for temporarily and/or more permanently containing, storing, transmitting, and retrieving computer-readable information.

Computer-readable storage medium 720 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 724 serves as an interface for receiving data from, and transmitting data to, other devices, computer systems, and networks. For example, communication subsystem 724 may allow computer system 700 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 724 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 724 may provide components configured for wired communication (e.g., Ethernet) in addition to or instead of components configured for wireless communication.

One of ordinary skill in the art will realize that the architecture shown in FIG. 7 is only an example architecture of computer system 700, and that computer system 700 may have additional or fewer components than shown, or a different configuration of components. The various components shown in FIG. 7 may be implemented in hardware, software, firmware or any combination thereof, including one or more signal processing and/or application specific integrated circuits.

Figure 8:
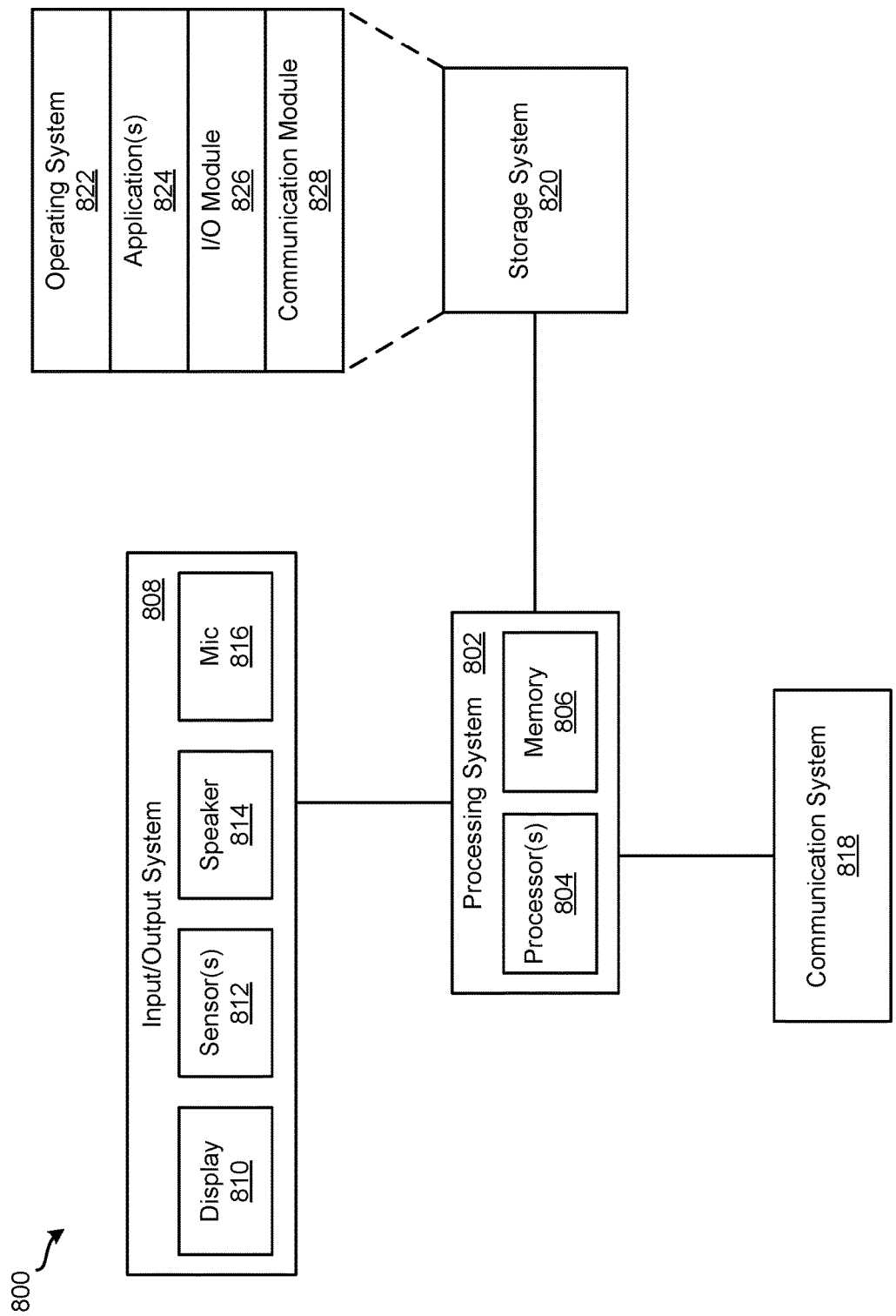
FIG. 8 illustrates an exemplary computing device, in which various embodiments may be implemented.

FIG. 8 illustrates an exemplary computing device 800 for implementing various embodiments described above. For example, computing device 800 may be used to implement client devices 105*a-n*. Computing device 800 may be a cellphone, a smartphone, a wearable device, an activity tracker or manager, a tablet, a personal digital assistant (PDA), a media player, or any other type of mobile computing device or combination thereof. As shown in FIG. 8, computing device 800 includes processing system 802, input/output (I/O) system 808, communication system 818, and storage system 820. These components may be coupled by one or more communication buses or signal lines.

Processing system 802, which can be implemented as one or more integrated circuits (e.g., a conventional microprocessor or microcontroller), controls the operation of computing device 800. As shown, processing system 802 includes one or more processors 804 and memory 806. Processors 804 are configured to run or execute various software and/or sets of instructions stored in memory 806 to perform various functions for computing device 800 and to process data.

Each processor of processors 804 may include one processing unit (e.g., a single core processor) or several processing units (e.g., a multicore processor). In some embodiments, processors 804 of processing system 802 may be implemented as independent processors while, in other embodiments, processors 804 of processing system 802 may be implemented as multiple processors integrate into a single chip. Still, in some embodiments, processors 804 of processing system 802 may be implemented as a combination of independent processors and multiple processors integrated into a single chip.

Memory 806 may be configured to receive and store software (e.g., operating system 822, applications 824, I/O module 826, communication module 828, etc. from storage system 820) in the form of program instructions that are loadable and executable by processors 804 as well as data generated during the execution of program instructions. In some embodiments, memory 806 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 808 is responsible for receiving input through various components and providing output through various components. As shown for this example, I/O system 808 includes display 810, one or more sensors 812, speaker 814, and microphone 816. Display 810 is configured to output visual information (e.g., a graphical user interface (GUI) generated and/or rendered by processors 804). In some embodiments, display 810 is a touch screen that is configured to also receive touch-based input. Display 810 may be implemented using liquid crystal display (LCD) technology, light-emitting diode (LED) technology, organic LED (OLED) technology, organic electro luminescence (OEL) technology, or any other type of display technologies. Sensors 812 may include any number of different types of sensors for measuring a physical quantity (e.g., temperature, force, pressure, acceleration, orientation, light, radiation, etc.). Speaker 814 is configured to output audio information and microphone 816 is configured to receive audio input. One of ordinary skill in the art will appreciate that I/O system 808 may include any number of additional, fewer, and/or different components. For instance, I/O system 808 may include a keypad or keyboard for receiving input, a port for transmitting data, receiving data and/or power, and/or communicating with another device or component, an image capture component for capturing photos and/or videos, etc.

Communication system 818 serves as an interface for receiving data from, and transmitting data to, other devices, computer systems, and networks. For example, communication system 818 may allow computing device 800 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 818 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 818 may provide components configured for wired communication (e.g., Ethernet) in addition to or instead of components configured for wireless communication.

Storage system 820 handles the storage and management of data for computing device 800. Storage system 820 may be implemented by one or more non-transitory machine-readable mediums that are configured to store software (e.g., programs, code modules, data constructs, instructions, etc.) and store data used for, or generated during, the execution of the software.

In this example, storage system 820 includes operating system 822, one or more applications 824, I/O module 826, and communication module 828. Operating system 822 includes various procedures, sets of instructions, software components and/or drivers for controlling and managing general system tasks (e.g., memory management, storage device control, power management, etc.) and facilitates communication between various hardware and software components. Operating system 822 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 824 can include any number of different applications installed on computing device 800. Examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 826 manages information received via input components (e.g., display 810, sensors 812, and microphone 816) and information to be outputted via output components (e.g., display 810 and speaker 814). Communication module 828 facilitates communication with other devices via communication system 818 and includes various software components for handling data received from communication system 818.

One of ordinary skill in the art will realize that the architecture shown in FIG. 8 is only an example architecture of computing device 800, and that computing device 800 may have additional or fewer components than shown, or a different configuration of components. The various components shown in FIG. 8 may be implemented in hardware, software, firmware or any combination thereof, including one or more signal processing and/or application specific integrated circuits.

Figure 9:
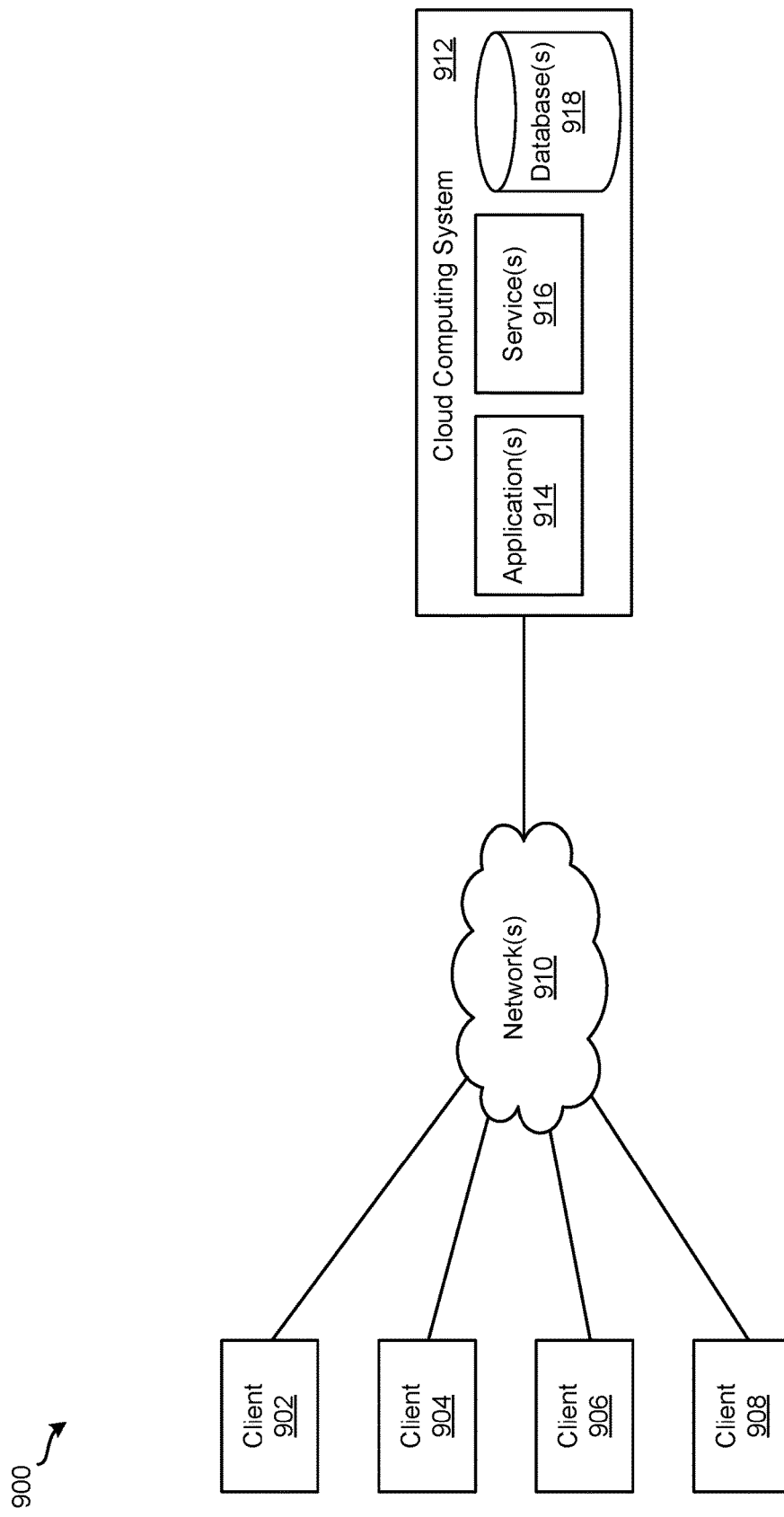
FIG. 9 illustrates system for implementing various embodiments described above.

FIG. 9 illustrates an exemplary system 900 for implementing various embodiments described above. For example, cloud computing system 912 of system 900 may be used to implement computing system 110 and client devices 902-908 may be used to implement client devices 105a-n. As shown, system 900 includes client devices 902-908, one or more networks 910, and cloud computing system 912. Cloud computing system 912 is configured to provide resources and data to client devices 902-908 via networks 910. In some embodiments, cloud computing system 900 provides resources to any number of different users (e.g., customers, tenants, organizations, etc.). Cloud computing system 912 may be implemented by one or more computer systems (e.g., servers), virtual machines operating on a computer system, or a combination thereof.

As shown, cloud computing system 912 includes one or more applications 914, one or more services 916, and one or more databases 918. Cloud computing system 900 may provide applications 914, services 916, and databases 918 to any number of different customers in a self-service, subscription-based, elastically scalable, reliable, highly available, and secure manner.

In some embodiments, cloud computing system 900 may be adapted to automatically provision, manage, and track a customer's subscriptions to services offered by cloud computing system 900. Cloud computing system 900 may provide cloud services via different deployment models. For example, cloud services may be provided under a public cloud model in which cloud computing system 900 is owned by an organization selling cloud services and the cloud services are made available to the general public or different industry enterprises. As another example, cloud services may be provided under a private cloud model in which cloud computing system 900 is operated solely for a single organization and may provide cloud services for one or more entities within the organization. The cloud services may also be provided under a community cloud model in which cloud computing system 900 and the cloud services provided by cloud computing system 900 are shared by several organizations in a related community. The cloud services may also be provided under a hybrid cloud model, which is a combination of two or more of the aforementioned different models.

In some instances, any one of applications 914, services 916, and databases 918 made available to client devices 902-908 via networks 910 from cloud computing system 900 is referred to as a "cloud service." Typically, servers and systems that make up cloud computing system 900 are different from the on-premises servers and systems of a customer. For example, cloud computing system 900 may host an application and a user of one of client devices 902-908 may order and use the application via networks 910.

Applications 914 may include software applications that are configured to execute on cloud computing system 912 (e.g., a computer system or a virtual machine operating on a computer system) and be accessed, controlled, managed, etc. via client devices 902-908. In some embodiments, applications 914 may include server applications and/or mid-tier applications (e.g., HTTP (hypertext transport protocol) server applications, FTP (file transfer protocol) server applications, CGI (common gateway interface) server applications, JAVA server applications, etc.). Services 916 are software components, modules, application, etc. that are configured to execute on cloud computing system 912 and provide functionalities to client devices 902-908 via networks 910. Services 916 may be web-based services or on-demand cloud services.

Databases 918 are configured to store and/or manage data that is accessed by applications 914, services 916, and/or client devices 902-908. For instance, storages 130-145 may be stored in databases 918. Databases 918 may reside on a non-transitory storage medium local to (and/or resident in) cloud computing system 912, in a storage-area network (SAN), on a non-transitory storage medium local located remotely from cloud computing system 912. In some embodiments, databases 918 may include relational databases that are managed by a relational database management system (RDBMS). Databases 918 may be a column-oriented databases, row-oriented databases, or a combination thereof. In some embodiments, some or all of databases 918 are in-memory databases. That is, in some such embodiments, data for databases 918 are stored and managed in memory (e.g., random access memory (RAM)).

Client devices 902-908 are configured to execute and operate a client application (e.g., a web browser, a proprietary client application, etc.) that communicates with applications 914, services 916, and/or databases 918 via networks 910. This way, client devices 902-908 may access the various functionalities provided by applications 914, services 916, and databases 918 while applications 914, services 916, and databases 918 are operating (e.g., hosted) on cloud computing system 900. Client devices 902-908 may be computer system 700 or computing device 800, as described above by reference to FIGS. 7 and 8, respectively. Although system 900 is shown with four client devices, any number of client devices may be supported.

Networks 910 may be any type of network configured to facilitate data communications among client devices 902-908 and cloud computing system 912 using any of a variety of network protocols. Networks 910 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit of a device, the program comprising sets of instructions for:
   generating a set of documents;
   loading data associated with each data object in a set of data objects in a document in the set of documents, each data object comprising a set of users;
   receiving a record from a first user, the record comprising a set of items;
   for each item in the set of items, determining one or more data objects in the set of data objects based on a hierarchy comprising a plurality of nodes representing a plurality of users by:
      identifying a node in the plurality of nodes in the hierarchy that represents the first user,
      traversing the hierarchy of the plurality of nodes to identify a set of nodes that are ancestors of the identified node,
      performing a search on the set of documents to identify the one or more data objects in the set of data objects, wherein each data object in the one or more data objects has at least one user in the set of users of the data object that matches a user represented by a node in the set of nodes, and
      associating the identified one or more data objects in the set of data objects with the item; and
   providing to a second user information for a subset of the set of data objects associated with the second user.

2. The non-transitory machine-readable medium of claim 1, wherein the information for the subset of the set of objects comprises at least one item in the set of items.

3. The non-transitory machine-readable medium of claim 1, wherein each data object in the set of data objects specifies a date range, wherein each item in the set of items includes a transaction date associated with the item, wherein determining the one or more data objects in the set of data objects for each item comprises:
   identifying data objects in the set of data objects having a date range within which the transaction date of the item falls; and
   including the identified data objects in the one or more data objects.

4. The non-transitory machine-readable medium of claim 1, wherein each data object in the set of data objects specifies a set of item types, wherein each item in the set of items includes an item type associated with the item, wherein determining the one or more data objects in the set of data objects for each item comprises:
   identifying data objects in the set of data objects having an item type in the set of item types that matches the item type associated with the item; and
   including the identified data objects in the one or more data objects.

5. The non-transitory machine-readable medium of claim 1, wherein the information for each data object in the subset of the set of data objects comprises a total amount, a first amount of the total amount that is spent, a second amount of the total amount that is available for spending, and an amount of the second amount that is pending approval.

6. The non-transitory machine-readable medium of claim 1, wherein the record comprising the set of items is a first record comprising a first set of items, wherein the subset of the set of data objects is a first subset of the set of data objects, wherein the node in the plurality of nodes in the hierarchy is a first node, wherein the set of nodes is a first set of nodes, wherein the program further comprises set of instructions for:
   receiving a second record from a third user, the second record comprising a second set of items;
   for each item in the second set of items, determining one or more data objects in the set of data objects based on the hierarchy of users by:
      identifying a second node in the plurality of nodes in the hierarchy that represents the second user,
      traversing the hierarchy of the plurality of nodes to identify a second set of nodes that are ancestors of the identified second node,
      performing a search on the set of documents to identify the one or more data objects in the set of data objects, wherein each data object in the one or more data objects has at least one user in the set of users of the data object that matches a user represented by a node in the second set of nodes and
      associating the identified one or more data objects in the set of data objects with the item; and
   providing to a fourth user information for a second subset of the set of data objects associated with the fourth user.

7. A method comprising:
   generating a set of documents;

loading data associated with each data object in a set of data objects in a document in the set of documents, each data object comprising a set of users;

receiving a record from a first user, the record comprising a set of items;

for each item in the set of items, determining one or more data objects in the set of data objects based on a hierarchy comprising a plurality of nodes representing a plurality of users by:

identifying a node in the plurality of nodes in the hierarchy that represents the first user, traversing the hierarchy of the plurality of nodes to identify a set of nodes that are ancestors of the identified node, performing a search on the set of documents to identify the one or more data objects in the set of data objects, wherein each data object in the one or more data objects has at least one user in the set of users of the data object that matches a user represented by a node in the set of nodes; and providing to a second user information for a subset of the set of data objects associated with the second user, wherein the information for the subset of the set of objects comprises at least one item in the set of items.

8. The method of claim 7, wherein the information for the subset of the set of objects comprises at least one item in the set of items.

9. The method of claim 7, wherein each data object in the set of data objects specifies a date range, wherein each item in the set of items includes a transaction date associated with the item, wherein determining the one or more data objects in the set of data objects for each item comprises:

identifying data objects in the set of data objects having a date range within which the transaction date of the item falls; and including the identified data objects in the one or more data objects.

10. The method of claim 7, wherein each data object in the set of data objects specifies a set of item types, wherein each item in the set of items includes an item type associated with the item, wherein determining the one or more data objects in the set of data objects for each item comprises:

identifying data objects in the set of data objects having an item type in the set of item types that matches the item type associated with the item; and including the identified data objects in the one or more data objects.

11. The method of claim 7, wherein the information for each data object in the subset of the set of data objects comprises a total amount, a first amount of the total amount that is spent, a second amount of the total amount that is available for spending, and an amount of the second amount that is pending approval.

12. The method of claim 7, wherein the record comprising the set of items is a first record comprising a first set of items, wherein the subset of the set of data objects is a first subset of the set of data objects, wherein the node in the plurality of nodes in the hierarchy is a first node, wherein the set of nodes is a first set of nodes, wherein the method further comprises:

receiving a second record from a third user, the second record comprising a second set of items;

for each item in the second set of items, determining one or more data objects in the set of data objects based on the hierarchy of users by:

identifying a second node in the plurality of nodes in the hierarchy that represents the second user, traversing the hierarchy of the plurality of nodes to identify a second set of nodes that are ancestors of the identified second node, performing a search on the set of documents to identify the one or more data objects in the set of data objects, wherein each data object in the one or more data objects has at least one user in the set of users of the data object that matches a user represented by a node in the second set of nodes; and providing to a fourth user information for a second subset of the set of data objects associated with the fourth user.

13. A system comprising:

a set of processing units; and a non-transitory machine-readable medium storing instructions that when executed by at least one processing unit in the set of processing units cause the at least one processing unit to:

generate a set of documents;

load data associated with each data object in a set of data objects in a document in the set of documents, each data object comprising a set of users;

receive a record from a first user, the record comprising a set of items;

for each item in the set of items, determine one or more data objects in the set of data objects based on a hierarchy comprising a plurality of nodes representing a plurality of users by:

identifying a node in the plurality of nodes in the hierarchy that represents the first user, traversing the hierarchy of the plurality of nodes to identify a set of nodes that are ancestors of the identified node, and performing a search on the set of documents to identify the one or more data objects in the set of data objects, wherein each data object in the one or more data objects has at least one user in the set of users of the data object that matches a user represented by a node in the set of nodes and associating the identified one or more data objects in the set of data objects with the item; and provide to a second user information for a subset of the set of data objects associated with the second user.

14. The system of claim 13, wherein the information for the subset of the set of objects comprises at least one item in the set of items.

15. The system of claim 13, wherein each data object in the set of data objects specifies a date range, wherein each item in the set of items includes a transaction date associated with the item, wherein determining the one or more data objects in the set of data objects for each item comprises:

identifying data objects in the set of data objects having a date range within which the transaction date of the item falls; and including the identified data objects in the one or more data objects.

16. The system of claim 13, wherein each data object in the set of data objects specifies a set of item types, wherein each item in the set of items includes an item type associated with the item, wherein determining the one or more data objects in the set of data objects for each item comprises:

identifying data objects in the set of data objects having an item type in the set of item types that matches the item type associated with the item; and including the identified data objects in the one or more data objects.

17. The system of claim 13, wherein the information for each data object in the subset of the set of data objects comprises a total amount, a first amount of the total amount that is spent, a second amount of the total amount that is available for spending, and an amount of the second amount that is pending approval.

18. The system of claim 13, wherein the record comprising the set of items is a first record comprising a first set of items, wherein the subset of the set of data objects is a first subset of the set of data objects, wherein the node in the plurality of nodes in the hierarchy is a first node, wherein the set of nodes is a first set of nodes, wherein the instructions further cause the at least one processing unit to:

receive a second record from a third user, the second record comprising a second set of items;

for each item in the second set of items, determine one or more data objects in the set of data objects based on the hierarchy of users by:

identifying a second node in the plurality of nodes in the hierarchy that represents the second user, traversing the hierarchy of the plurality of nodes to identify a second set of nodes that are ancestors of the identified second node, performing a search on the set of documents to identify the one or more data objects in the set of data objects, wherein each data object in the one or more data objects has at least one user in the set of users of the data object that matches a user represented by a node in the second set of nodes; and provide to a fourth user information for a second subset of the set of data objects associated with the fourth user.

19. The non-transitory machine readable medium of claim 1, wherein each data object in the set of data objects comprises a total amount, a first amount of the total amount that is spent, a second amount of the total amount that is available for spending, and an amount of the second amount that is pending approval, wherein each item in the set of items comprises an amount, wherein associating the identified one or more data objects in the set of data objects with the item for each item in the set of items comprises adding the amount of the item to the amount of the second amount that is pending approval.

20. The method of claim 7, wherein each data object in the set of data objects comprises a total amount, a first amount of the total amount that is spent, a second amount of the total amount that is available for spending, and an amount of the second amount that is pending approval, wherein each item in the set of items comprises an amount, wherein associating the identified one or more data objects in the set of data objects with the item for each item in the set of items comprises adding the amount of the item to the amount of the second amount that is pending approval.

* * * * *